(12) United States Patent  (10) Patent No.: US 6,615,864 B2
Chang  (45) Date of Patent: Sep. 9, 2003

(54) TORSION SPRING POOL CLEANER REED VALVE

(76) Inventor: Paul C. Chang, 2472 San Saba St., Tustin, CA (US) 92782

( * ) Notice: Subject to any disclaimer, the term of this patent is extended or adjusted under 35 U.S.C. 154(b) by 0 days.

(21) Appl. No.: 10/058,199

(22) Filed: Jan. 29, 2002

(65) Prior Publication Data

US 2003/0140968 A1 Jul. 31, 2003

(51) Int. Cl.[7] .............................. E04H 4/16; F16K 17/30
(52) U.S. Cl. .................. 137/521; 137/624.14; 137/518; 15/1.7
(58) Field of Search ................................. 137/521, 518, 137/624.14, 624.18, 855, 857

(56) References Cited

U.S. PATENT DOCUMENTS

| | | | |
|---|---|---|---|
| 5,265,297 A | * | 11/1993 | Gould et al. .................. 15/1.7 |
| 5,337,433 A | | 8/1994 | Gould et al. |
| 5,384,928 A | | 1/1995 | Khoury |
| 5,604,950 A | | 2/1997 | Stern |
| 5,634,229 A | | 6/1997 | Stoltz |
| 5,655,246 A | | 8/1997 | Chang |
| 5,992,451 A | | 11/1999 | Chang |
| 6,098,228 A | * | 8/2000 | Chang ............... 137/624.14 X |

* cited by examiner

*Primary Examiner*—Kevin Lee
(74) *Attorney, Agent, or Firm*—Gordon K. Anderson

(57) ABSTRACT

A pool cleaner reed valve for a pulsating submersible swimming pool cleaner which has a valve body (22) configured to fit into a pulsating valve enclosure. The body includes a rectangular inlet end (24) and an round outlet end (26) with a pair of fulcrum points (30) and restricting boundaries (32) for retaining and confining valve movements. A pair of opposed rigid valve plates (50) are angularly juxtaposed within the valve inlet end contiguously engaging the fulcrum points and respective restricting boundaries such that each opposed blade rotates inwardly on the fulcrum point until the distal ends intimately engage as influenced by negative fluid pressure applied by a pool pump. A pair of torsion springs (70) surround each restricting boundary and interface with each valve plate returning them to a parallel position when fluid pressure is terminated. A resilient sleeve (72) is positioned on each spring for eliminating a metal to metal contact with the spring to the valve plate.

18 Claims, 5 Drawing Sheets

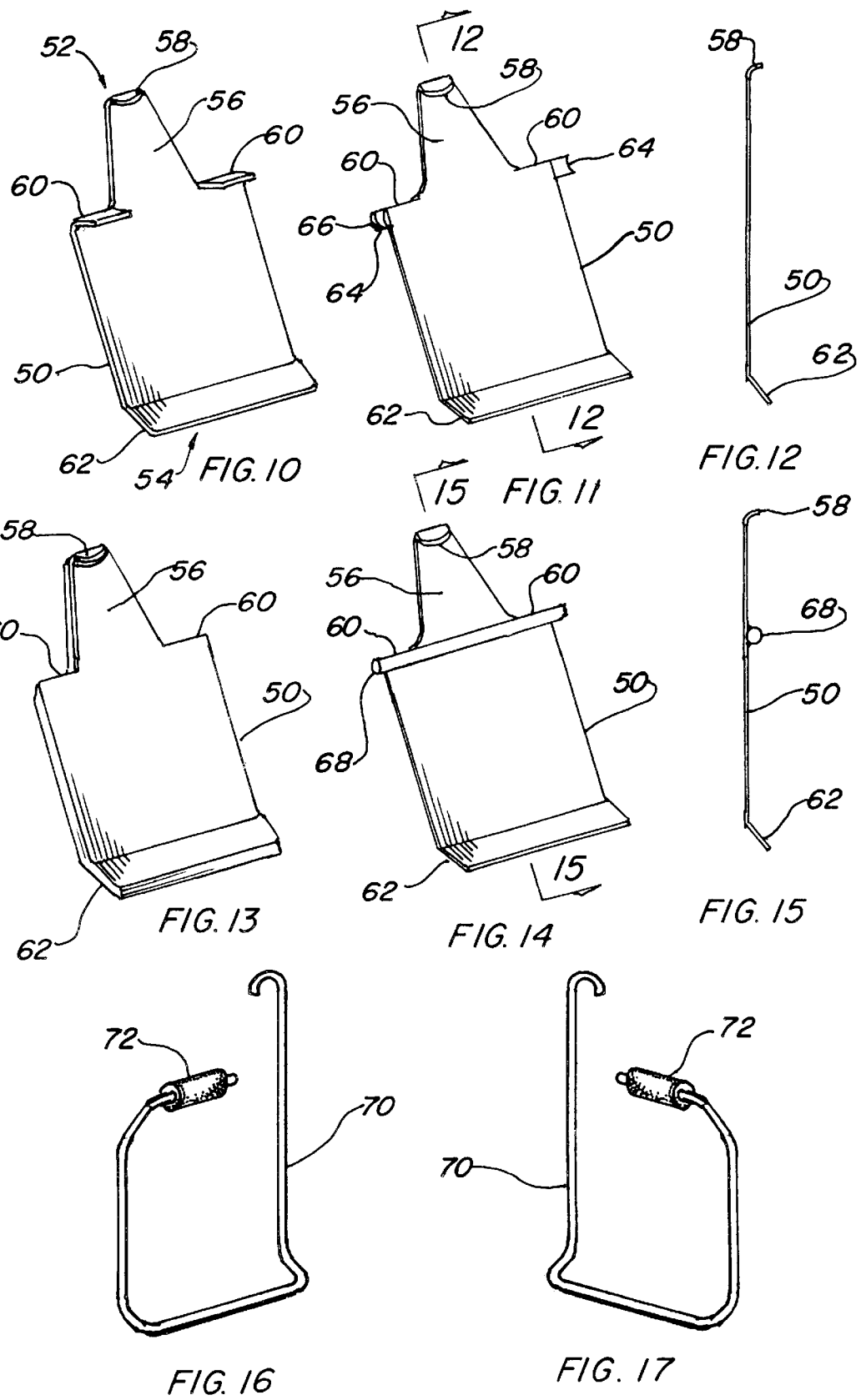

TORSION SPRING POOL CLEANER REED VALVE

TECHNICAL FIELD

The present invention relates to pool cleaning valves in general. More specifically to a reed valve used in a submersible pulsating pool cleaner actuated by the combination of hydraulic pressure and a torsion spring.

BACKGROUND ART

Previously, many types of valves have been used in endeavoring to provide an effective means for producing the pulsating effect in a submersible pulsating pool cleaner using the suction of the pool cleaner pump for removing debris from a swimming pool. A myriad of valves have been employed in the past including flappers, flexible diaphragms, flexible jaws, balls, elastomeric jaws as well as reed valves.

A search of the prior art did not disclose any patents that possess the novelty of the instant invention, however the following U.S. patents are considered related.

| Patent Number | Inventor | Issue Date |
| --- | --- | --- |
| 5,992,451 | Chang | Nov. 30, 1999 |
| 5,655,246 | Chang | Aug. 12, 1997 |
| 5,634,229 | Stoltz | Jun. 3, 1997 |
| 5,604,950 | Stern | Feb. 25, 1997 |
| 5,384,928 | Khoury | Jan. 31, 1995 |
| 5,337,433 | Gould et al. | Aug. 16, 1994 |

Chang in U.S. Pat. No. 5,992,451 is my most recent prior art patent upon which the improvements in the reed valve are based. The reed valve as taught by the patent utilizes a pair of opposed laminated valve plates with an outward bend on one end and a right angle bend on the other. When negative pressure is applied opposite the plates each plate draws together over a fulcrum until a right angle bend touches a restrictive boundary in the cage creating a first step in the dual action. As negative pressure continues the plates arcuately bow until the outward bends abut closing the valve to fluid flow creating the final step in the dual action. A garter spring urges the plates into their original position when pressure is relieved.

U.S. Pat. No. 5,655,246 issued to Chang is my first patent in which reed valve plates were used, which consists of a pair of opposed deflecting reeds, each having a fixed reed and a movable reed. The fixed reed is connected to the body on one end and a stud on the other, the valve is secured to the movable reed through an elongated slot. The spring action of the combination creates a double action movement flexing the reeds into a bow shape simultaneously with their combined spring action. The flow of water is impeded by the reed valve due to the shock wave or water hammer when the opposed movable reeds are drawn together at their distal ends.

Stoltz in U.S. Pat. No. 5,634,229 discloses a valve having jaw-like lips of a flexible material biased in an open position by its inherent elasticity and resiliency. The lips close under negative pressure and reopen due to the material establishing its inherent memory.

Stern in U.S. Pat. No. 5,604,950 teaches a suction nozzle having a body with a throat extending from an inlet at one end to an outlet on the other. The body is split into a number of discrete portions forming the throat. One body portion is moveable allowing the throat to automatically expand in response to movements of other body portions. The resulting expansion of the nozzle allows unrestricted passage of large foreign objects through the throat during the operation of the suction cleaning device.

U.S. Pat. No. 5,384,928 issued to Khoury is for a valve which is suitable for use in a fluid controlled swimming pool cleaner. The valve is made of a deformable material having a tubular core with a fastening formation near one end and a mushroom shaped annular flexible component at an opposite end.

Gould et at. teaches in U.S. Pat. No. 5,337,433, a valve having an entrance mouth with one or more single acting closure lips formed of a thin metal spring material. The lips are drawn into full closure by the suction of the pool pump and open when the bias is substantially less than the closing force. Partial flow of the pump is utilized in the apparatus at a specific design flow rate.

DISCLOSURE OF THE INVENTION

The most relevant problem plaguing submersible pool cleaners for decades is the reliability of the valves to create the pulsation effect for propelling the cleaner on the bottom and sides of a swimming pool. The reason for inherent short life of the valves of any type is that the pulsation or cyclic action can be as high as 6 cycles per second which creates fatigue in the base material regardless of its composition. This phenomena occurs in flappers, flexible diaphragms, flexible jaws, elastomeric jaws as well as metallic reed valves.

It is therefore a primary object of the invention to utilize a valve that, by its very nature, is robust and durable which is the basic novelty of the apparatus presented. This utility is accomplished by using a non-flexing reed valve plate made of stainless steel having a thickness that withstands the cyclic movement without bending in combination with a torsion spring also of stainless steel that is stiff enough to return the valves to their open position with a minimum of bending moment.

An important object of the invention is that the valve plate is surrounded by a restricting boundary on three sides and the end next to the valve body is retained by the torsion spring. This arrangement positions the valve plate always in the same location and the valve pivots on a fulcrum point rather than bending. Since the plate is always flat and no deflection or curving occurs the plate is not under stress and will function properly for extremely long periods of time. A prototype of the invention has been under test for over a year with absolutely no wear or any signs of deterioration.

Another object of the invention is the design has basically no moving metal to metal communication as the torsion springs are isolated with resilient sleeves and the valve plates only touch the thermoplastic of the body. It is possible however, for the valve plates to barely contact a horizontal side of the torsion spring on their outside surface when the valve plate is fully open but it should be realized that no stress or force is applied at that time when the torsion spring is at rest.

Still another object of the invention is directed to the simplicity of the reed valve plate itself as it is simply stamped in the desired form and two bends in the metal are formed by standard punch presses. Other embodiments of the reed valve plate are equally easy to manufacture and cost effective.

Yet another object of the invention is in the configuration of the valve body which in the unlikely advent that the reed valve plate must be replaced the procedure is extremely simple. The valve body is removed from the cleaner housing in the normal manner and the torsion spring is lifted up with ones finger releasing the valve plate allowing it to slide out of the restricting boundaries. Replacement is just the reverse procedure which is intuitively obvious to any user.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 10 is a partial isometric view of the preferred rigid valve plate.

FIG. 11 is a partial isometric view of the valve plate in an embodiment having outwardly extending tabs.

FIG. 12 is a cross sectional view taken along lines 12—12 of FIG. 11.

FIG. 13 is a partial isometric view of the valve plate in an embodiment having outwardly facing bends on the shoulders absent and the material is relatively thick.

FIG. 14 is a partial isometric view of the valve plate in an embodiment having outwardly extending stiffening rods attached to the plate.

FIG. 15 is a cross sectional view taken along lines 15—15 of FIG. 14.

FIG. 16 is a partial isometric view of the left hand torsion spring in the preferred embodiment completely removed from the invention for clarity.

FIG. 17 is a partial isometric view of the right hand torsion spring in the preferred embodiment completely removed from the invention for clarity.

BEST MODE FOR CARRYING OUT THE INVENTION

Figure 1:
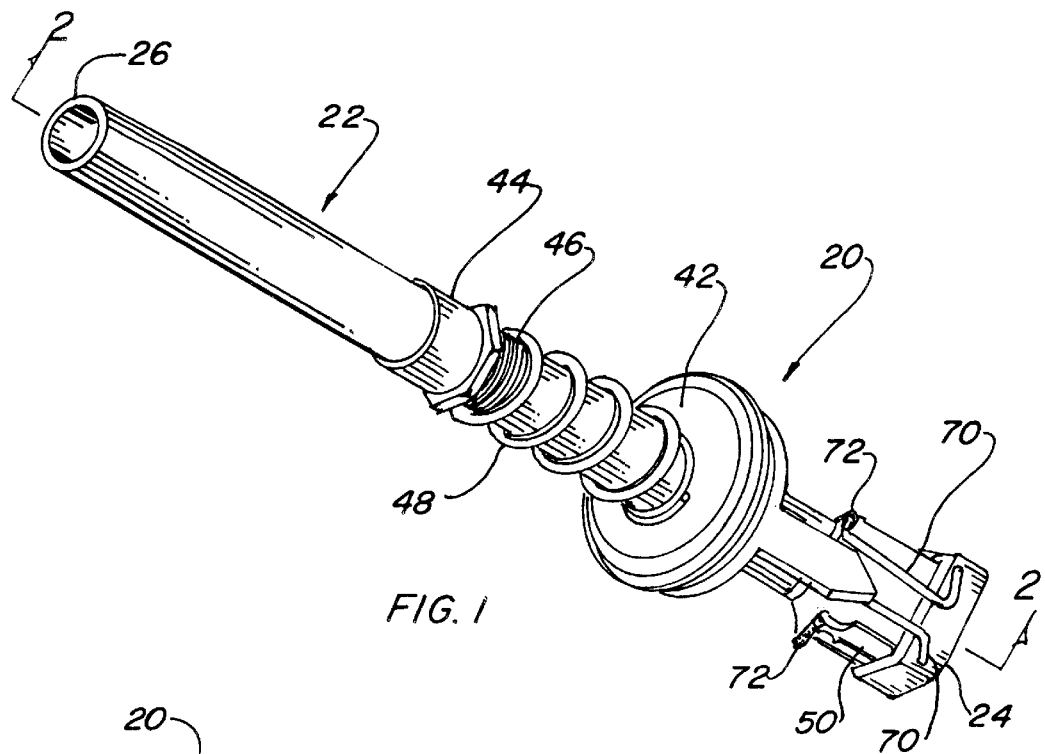
FIG. 1 is a partial isometric view of the preferred embodiment
Figure 2:
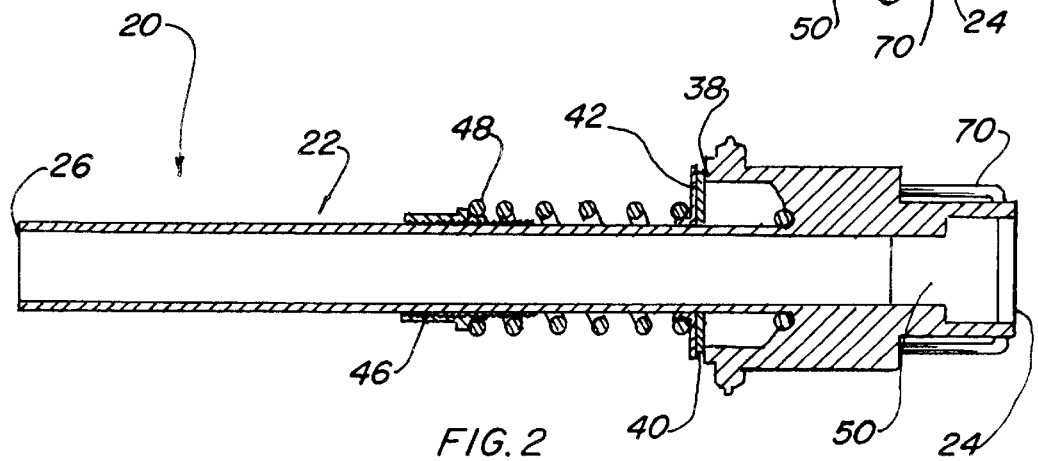
FIG. 2 is a cross sectional view taken along lines 2—2 of FIG. 1.
Figure 3:
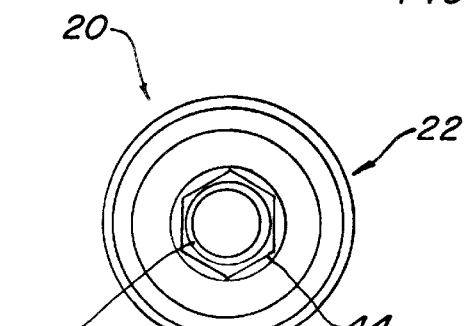
FIG. 3 is a left end view of the preferred embodiment.
Figure 4:
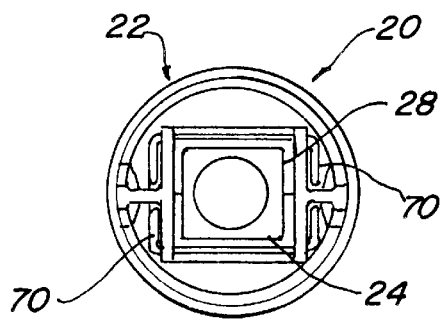
FIG. 4 is a right end view of the preferred embodiment.
Figure 5:
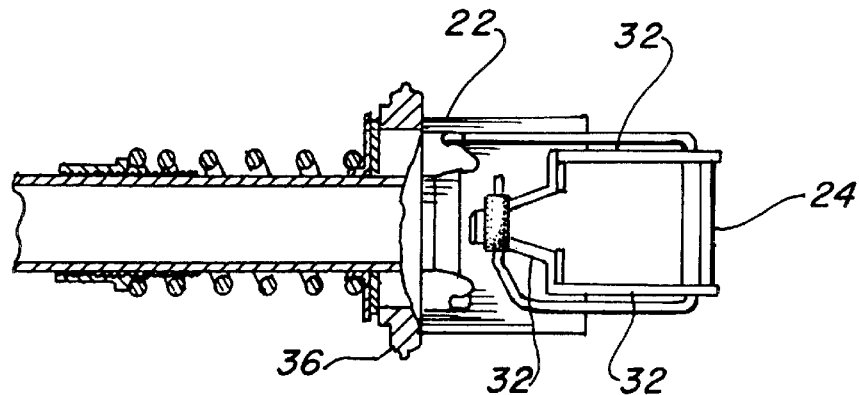
FIG. 5 is a partial top elevation view of the preferred embodiment.
Figure 6:
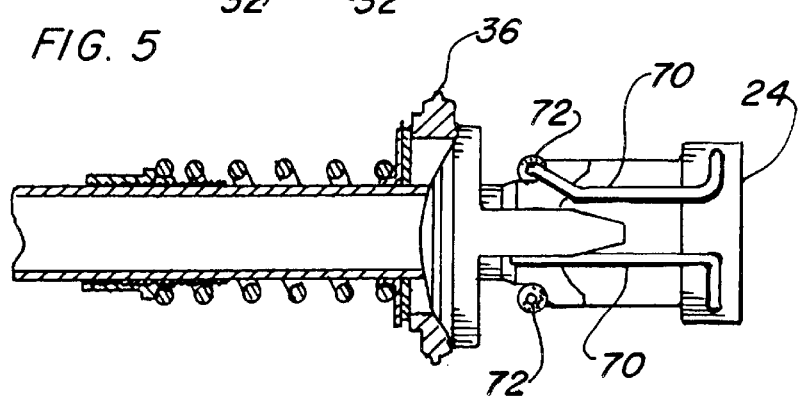
FIG. 6 is a partial side elevation view of the preferred embodiment.
Figure 7:
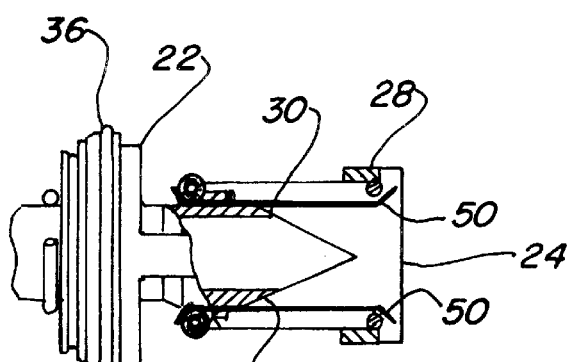
FIG. 7 is a partial side elevation view of the preferred embodiment taken along an arbitrary centerline in cross section illustrating the valves in their fully open position.
Figure 8:
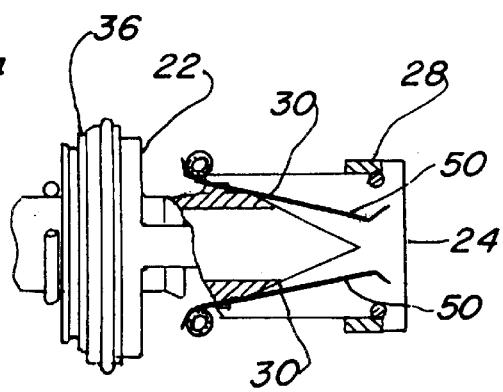
FIG. 8 is a partial side elevation view of the preferred embodiment taken along an arbitrary centerline in cross section illustrating the valves in their partially closed position.
Figure 9:
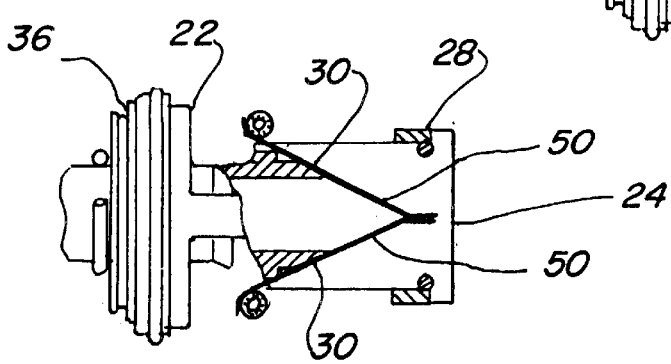
FIG. 9 is a partial side elevation view of the preferred embodiment taken along an arbitrary centerline in cross section illustrating the valves in their fully closed position.
Figure 18:
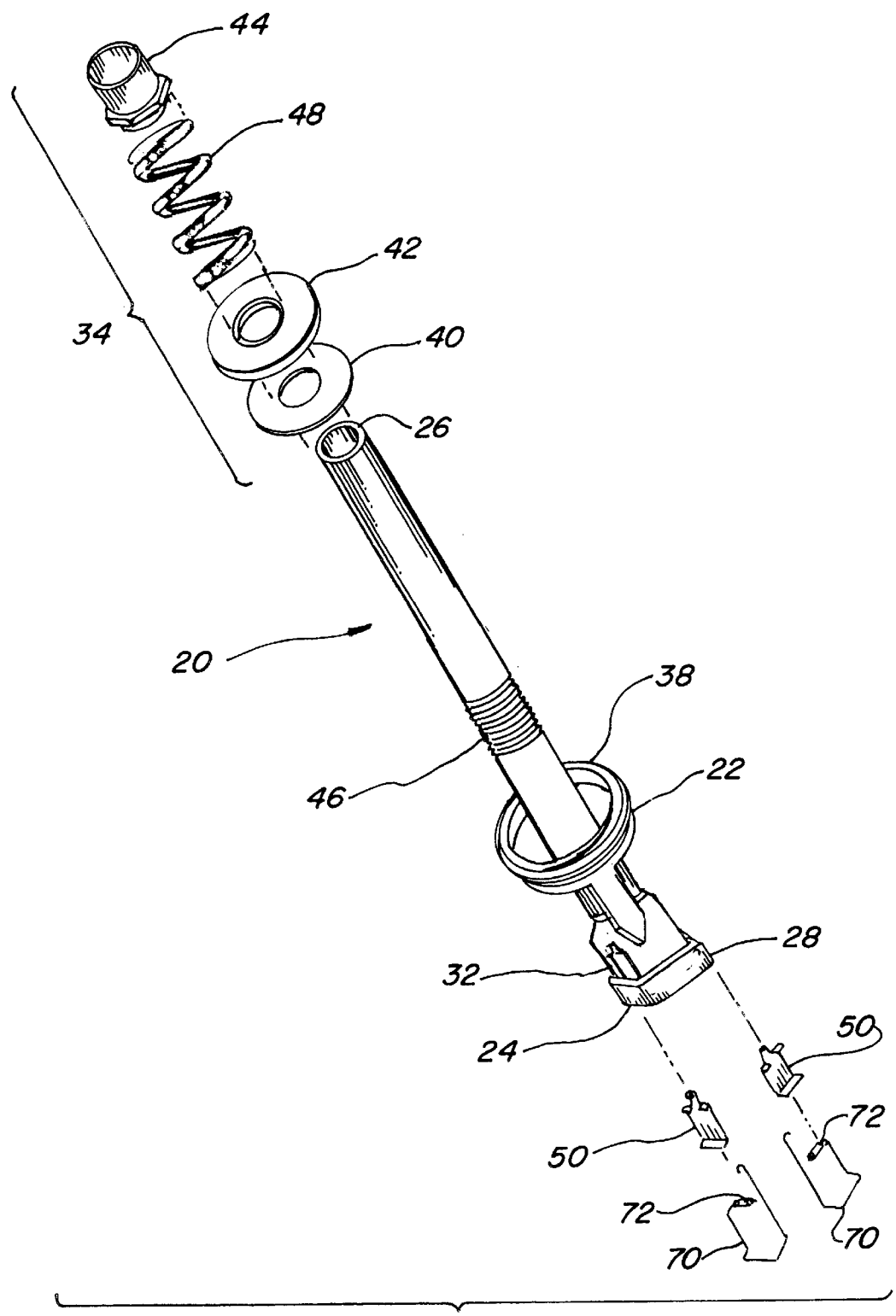
FIG. 18 is an exploded view of the preferred embodiment.

The best mode for carrying out the invention is presented in terms of a preferred embodiment. This preferred embodiment is shown in FIGS. 1 thorough 18 however it also includes some variation in the configuration of the valve plates. The basic pool cleaner reed valve 20 is comprised of a valve body 22 that incorporates a rectangular inlet end 24 and an round cylindrical outlet end 26. The inlet end 24 of the body has a rectangular opening 28 which includes a pair of fulcrum points 30 and a pair of restricting boundaries 32 for retaining and confining valve movements. The valve body 22 is configured to fit into a pulsating valve enclosure well known in the art.

The valve body 22 is preferably made of a injection molded thermoplastic and includes a relief valve 34 illustrated in FIGS. 1–6 consisting of a beaded sleeve 36, integral with the body 22, of a diameter permitting the body to enter into a pool cleaner enclosure with a sliding fit. The relief valve 34 further has a relief valve seat 38 on the upstream side of the beaded sleeve 36 and a resilient gasket 40 sized to mate with the valve seat 38 and is sealably attached around the valve body 22 on the circumference of the outlet end 26 adjacent to the seat 38. A rigid relief valve disc 42 is movably disposed around the outlet end 26 of the valve body 22 contiguous with the resilient gasket 40. A spring keeper 44 is threadably disposed on a threaded portion 46 of the valve body outlet end 26 with a compression spring 48 compressed between the spring keeper 44 and the disc 42.

When negative fluid pressure is applied to the cleaner by a pool pump, valve plates, described later, engage restricting the flow of fluid, at which point the relief valve 34 opens and releases the negative pressure allowing the plates to disengage creating a pulsating effect by combined action of the plates and the relief valve 34, enabling a pool cleaner to be propelled linearly around a swimming pools bottom and sides due to liquid flow kinetic energy transferring force to the cleaner by fluid inertia.

A pair of opposed rigid valve plates 50 are angularly juxtaposed within the valve body inlet end 24, with each valve plate 50 having a first end 52 and a second end 54 as shown in FIG. 10. The first end 52 contiguously engages the fulcrum points 30 and each valve plate includes a truncated extremity 56 which has an angular outwardly facing bend 58. The valve plates 50 also contain a pair of right angle outwardly facing shoulders 60, preferably bent outwardly, on opposed sides where the truncated extremity 56 commences. Each valve plate 50 engages its respective restricting boundary 32 which is formed on three sides of the valve plate confining it to movement in one plane. The second end 54 of the valve plate has a angular outwardly facing lateral bend 62, as depicted in FIGS. 7–10. Each opposed blade rotates inwardly on the fulcrum point 30, which is positioned from 18 percent to 22 percent of the valve plates length, until the second ends 54 intimately engage when urged by negative fluid pressure applied to the pool cleaner through the valve body 22.

The preferred material for the valve plates 50 is 300 series stainless steel of a thickness from 0.030 inches to 0.100 inches, (0.076 mm to 2.54 mm). The valve plates first end truncated extremity angular outwardly facing bend 58 has a height of from 0.130 inches to 0.150 inches (3.3 mm to 3.8 mm) and a radius of from 0.120 inches to 0.130 inches (3.0 mm to 3.3 mm). Further the valve plates outwardly facing shoulders 60 have a length of from 25 to 30 percent of the valve plates 50 overall width and height of 0.130 inches to 0.150 inches (3.3 mm to 3.8 mm) and the valve plate lateral bend further has an angle of from 25 to 35 degrees.

The preferred embodiment of the valve plate 50 is illustrated in FIG. 10 however other configurations will function with equal ease and should be considered as viable alternates. FIGS. 11 and 12 depict such a configuration which include inherent outwardly extending tabs 64 adjacent to the valve plates shoulders 60 on opposed sides with the tabs 64 and the area therebetween formed with a radial stiffening groove 66. This configuration obviously requires the valve body 22 to be altered to include a mating clearance radial groove in each side of the restricting boundaries 32.

FIG. 13 shows a valve plate where angular outwardly facing lateral bends are omitted and the valve plates have a thickness greater than 0.100 inch (2.54 mm). This embodiment is very robust and rigid and somewhat simpler to form, as two bends are eliminated, and the functioning characteristics are not altered in any way. FIGS. 14 and 15 show another type of valve plate 50 where each plate has an outwardly extending stiffening rod 68 attached to the plate adjacent to the shoulders 60 by welding, brazing or some other conventional means. Since the rod 68 protrudes beyond the sides a clearance radial groove in each side of the restricting boundaries is also necessary.

Many types of resilient devices have been tried in order to return a valve plate to its at rest position however none have given totally satisfactory operational life. One of the discoveries of the invention that achieves this goal is in the use of a pair of torsion springs 70, shown in FIGS. 16 and 17, that surround each restricting boundary 32 of the valves inlet end 24. The springs 70 also interface with each valve plate truncated extremity 56 holding the valve plates tightly against the valve body 22 with the truncated end bends 58 engaging each spring 70. The shoulders 60 are adjacently parallel to each fulcrum point 30 and the springs 70 function to return the valve plates 50 to a position parallel with each other after the second ends 54 of the valve plates 50 engage and fluid pressure from a pool pump is terminated.

The torsion springs have seven bends, surround the restricting boundaries 32 on all sides and contiguously engage the valve plates second end 54 adjacent to the lateral bend 62 and are preferably made of stainless steel having a diameter of from 0.080 inches to 0.100 inches (2.03 mm to 2.54 mm). In order to eliminate wear the torsion springs have a resilient sleeve 72 covering the interface between the torsion spring 70 and the valve plates outwardly facing bend 58.

The reason that the tension spring 70 is so advantageous is that the movement required to open the valve 50 is spread out over a long span and torque is applied to two angular bends simultaneously. Further the spring diameter is relatively large making the spring stiff where it is necessary to hold its shape and yet holds its shape with good memory and is sized to balance the force of the fluid pressure allowing the valves to close properly at their ends.

The operation of the pool cleaner reed valve has been described previously and the relationship of the relief valve to cause the pulsation effect has also been described in detail.

Figure 19:
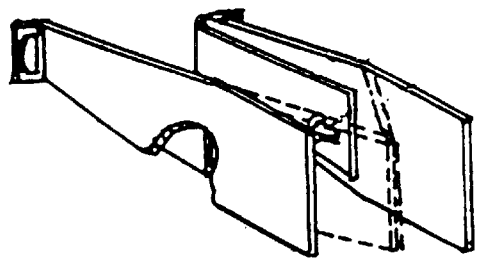
FIG. 19 is an isometric view of a prior art valve with flexible leafs.
Figure 20:
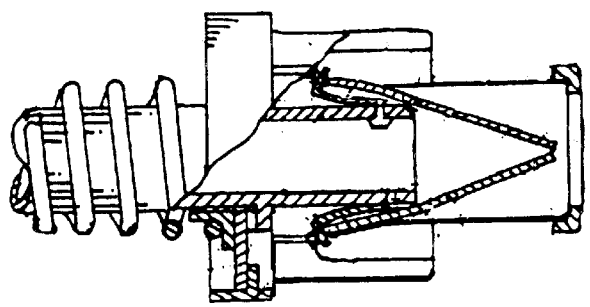
FIG. 20 is cutaway side view of my prior art valve with double acting reeds consisting of a fixed reed and a movable reed connected with a stud.
Figure 21:
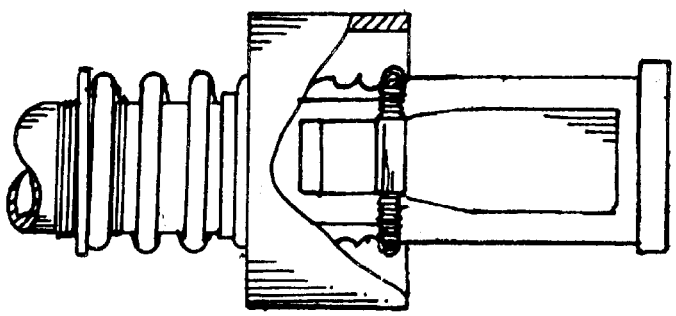
FIG. 21 is a cutaway side view of my prior art valve with flexible laminated valve plates and a garter spring.

For background purposes prior art embodiments have been included in the drawings with FIG. 19 illustrating a valve with flexible leafs, FIG. 20 showing my prior art valve with double acting reeds consisting of a fixed reed and a movable reed connected with a stud and FIG. 21 is my prior art valve with flexible laminated valve plates and a garter spring.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A pool cleaner reed valve for a pulsating submersible swimming pool cleaner comprising, a valve body having a rectangular inlet end, and an round cylindrical outlet end, wherein said inlet end having a rectangular opening with a pair of fulcrum points and a pair of restricting boundaries for retaining and confining valve movements, said valve body configured to fit into a pulsating valve enclosure, a pair of opposed rigid valve plates angularly juxtaposed within the valve body inlet end, with each valve plate having a first end and a second end wherein said first end contiguously engaging the rectangular opening fulcrum points and each having a truncated extremity including an angular outwardly facing bend with a pair of right angle outwardly facing shoulders on opposed sides where the truncated extremity commences, wherein each valve engaging a respective restricting boundary and the second end having a angular outwardly facing lateral bend, such that each opposed blade rotates inwardly on the fulcrum point until the second ends intimately engage as urged by negative fluid pressure applied to the pool cleaner through the valve body, and a pair of torsion springs surrounding each restricting boundary of the valves inlet end, interfacing with each valve plate truncated end, holding the valve plates tightly against the valve body with the truncated extremity outwardly facing bends contiguous with each spring and the shoulders adjacently parallel with each fulcrum point, returning the valve plates to a parallel position after the second ends engage and fluid pressure is terminated.

2. The pool cleaner reed valve as recited in claim 1 wherein said valve body is thermoplastic.

3. The pool cleaner reed valve as recited in claim 1 wherein said valve body further comprises a relief valve having:

a beaded sleeve of a diameter permitting the body to enter into a pool cleaner with a sliding fit, an integrally formed relief valve seat on an upstream side of the beaded sleeve, a relief valve resilient gasket sized to mate with the valve seat and sealably attached around the valve body round cylindrical outlet ends circumference, adjacent to the relief valve seat, a rigid relief valve disc movably disposed around the round cylindrical outlet end of the valve body, contiguous with the relief valve resilient gasket, said round cylindrical outlet end of the valve body having a threaded portion thereon, a spring keeper threadably disposed on the threaded portion of the valve body, and a compression spring compressed between the spring keeper and the relief valve disc such that when negative fluid pressure is applied by a pool pump the second ends of the valve plates engage restricting the flow of fluid, at which point the relief valve opens and releases negative pressure allowing the torsion springs to disengage the valve plates creating a pulsating effect by combined action of the valve plates and the relief valve, enabling a pool cleaner to be propelled linearly around a swimming pools bottom and sides due to liquid flow kinetic energy transferring force to the cleaner by fluid inertia.

4. The pool cleaner reed valve as recited in claim 1 wherein said fulcrum points are positioned from 18 percent to 22 percent of the valve plates length.

5. The pool cleaner reed valve as recited in claim 1 wherein said restricting boundaries are formed on three sides of the valve plates confining the valve plate to movement to one plane.

6. The pool cleaner reed valve as recited in claim 1 wherein said valve plates are made of 300 series stainless steel.

7. The pool cleaner reed valve as recited in claim 6 wherein said stainless steel valve plates have a thickness of from 0.030 inch to 0.100 inch, (0.076 mm to 2.54 mm).

8. The pool cleaner reed valve as recited in claim 1 wherein said valve plates first end truncated extremity angular outwardly facing bend has a height of from 0.130 inches to 0.150 inches (3.3 mm to 3.8 mm) and a radius of from 0.120 inches to 0.130 inches (3.0 mm to 3.3 mm).

9. The pool cleaner reed valve as recited in claim 1 wherein said valve plates first end right angle outwardly facing shoulders on opposed sides where the truncated end commences have a length of from 25 to 30 percent of the valve plates overall width and height of 0.130 inches to 0.150 inches (3.3 mm to 3.8 mm).

10. The pool cleaner reed valve as recited in claim 1 wherein said valve plate second end angular outwardly facing lateral bend further comprises an angle of from 25 to 35 degrees.

11. The pool cleaner reed valve as recited in claim 1 wherein said valve plates further comprise, said valve body having a clearance radial groove in each side of the restricting boundaries, each valve plate having outwardly extending tabs adjacent to said valve plates first end right angle outwardly facing shoulders on opposed sides where the truncated end commences, and said valve plate tabs and an area between the tabs having a radial stiffening groove formed therein.

12. The pool cleaner reed valve as recited in claim 1 wherein said valve plates angular outwardly facing lateral bends are absent and the valve plates have a thickness greater than 0.100 inch (2.54 mm).

13. The pool cleaner reed valve as recited in claim 1 wherein said valve plates further comprise, said valve body having a clearance radial groove in each side of the restricting boundaries, each valve plate having an outwardly extending stiffening rod attached to the plate adjacent to the valve plates first end right angle outwardly facing shoulders on opposed sides where the truncated end commences, and said valve plates outwardly extending stiffening rod interface with clearance radial groove in each side of the restricting boundaries.

14. The pool cleaner reed valve as recited in claim 1 wherein said torsion springs have seven bends, surround the restricting boundaries on all sides and contiguously engage the valve plates outwardly facing second end adjacent to the lateral bend.

15. The pool cleaner reed valve as recited in claim 1 wherein said torsion springs are made of stainless steel having a diameter of from 0.080 inches to 0.100 inches (2.03 mm to 2.54 mm).

16. The pool cleaner reed valve as recited in claim 1 wherein said torsion springs further comprise a resilient sleeve covering the interface between the torsion spring and the valve plates truncated extremity adjacent to the angular outwardly facing bend.

17. A pool cleaner reed valve for a pulsating submersible swimming pool cleaner comprising, a valve body having a inlet end, and an outlet end, wherein said inlet end having a pair of fulcrum points and a pair of restricting boundaries for retaining and confining valve movements, a pair of opposed rigid valve plates on the valve body inlet end, with each valve plate contiguously engaging the fulcrum points and respective restricting boundaries such that each blade rotates inwardly on the fulcrum point until ends intimately engage as urged by negative fluid pressure applied to the pool cleaner through the valve body, and a pair of torsion springs surrounding each restricting boundary interfacing with each valve plate, holding the valve plates tightly against the valve body returning the valve plates to a parallel position after engagement when fluid pressure is terminated.

18. A pool cleaner reed valve for a pulsating submersible swimming pool cleaner comprising, a valve body having a pair of fulcrum points and a pair of boundaries for retaining and confining valve movements, a pair of opposed rigid valve plates moveably disposed on the valve body contiguously engaging the fulcrum points and respective boundaries such that each blade rotates inwardly on the fulcrum point until ends intimately engage, and a pair of torsion springs interfacing with each valve plate, holding the valve plates tightly against the valve body returning the valve plates to a parallel position after engagement.

\* \* \* \* \*